US010564518B2

(12) United States Patent
Tindall

(10) Patent No.: US 10,564,518 B2
(45) Date of Patent: Feb. 18, 2020

(54) ENVIRONMENTAL LIGHTING SYSTEM AND METHOD

(71) Applicant: John R. Tindall, Oak Park, CA (US)

(72) Inventor: John R. Tindall, Oak Park, CA (US)

( * ) Notice: Subject to any disclaimer, the term of this patent is extended or adjusted under 35 U.S.C. 154(b) by 233 days.

(21) Appl. No.: 14/950,215

(22) Filed: Nov. 24, 2015

(65) Prior Publication Data

US 2016/0147132 A1 May 26, 2016

Related U.S. Application Data

(60) Provisional application No. 62/083,480, filed on Nov. 24, 2014.

(51) Int. Cl.
*G03B 15/02* (2006.01)

(52) U.S. Cl.
CPC .................... *G03B 15/02* (2013.01)

(58) Field of Classification Search
CPC ...... G03B 15/02; G03B 15/06; G02B 5/0284; G02B 5/0294; F21V 7/16; F21V 7/06
USPC ......................................................... 396/182
See application file for complete search history.

(56) References Cited

U.S. PATENT DOCUMENTS

| 6,824,283 | B2 * | 11/2004 | Pohlert | G03B 15/02 348/E5.029 |
| 7,399,097 | B1 * | 7/2008 | DeLaPaz | G03B 15/02 362/17 |
| 7,764,451 | B2 * | 7/2010 | Li | G02B 26/008 348/743 |
| 9,036,022 | B2 * | 5/2015 | Tsuboi | H05K 13/0413 348/135 |
| 2002/0075666 | A1 * | 6/2002 | Shirilla | F21V 7/18 362/16 |
| 2007/0296325 | A1 * | 12/2007 | Sasaki | H01J 1/63 313/483 |
| 2011/0063858 | A1 * | 3/2011 | Ortiz-Gavin | G02B 5/201 362/343 |
| 2013/0322051 | A1 * | 12/2013 | Ortiz-Gavin | G03B 15/06 362/11 |
| 2015/0062864 | A1 * | 3/2015 | Peterson | F21V 7/0008 362/17 |
| 2017/0248834 | A1 * | 8/2017 | Ortiz-Gavin | G03B 15/06 |

* cited by examiner

*Primary Examiner* — Anabel Ton
(74) *Attorney, Agent, or Firm* — Stetina Brunda Garred and Brucker

(57) ABSTRACT

A photography lighting system operative to impart patterns of complimentary colors that mimic the ambient light of natural surroundings creating a faithful rendering of the subject. The patterns include sinusoidal (sine waves) and other shapes that act to blend the colors and also help to accentuate a three-dimensional rendering of the subject. This invention gives the illusion of a soft white light source but with the added desirable qualities of minimizing imperfections and improving the "natural look" of human faces, especially with digital photography, and designed to replace traditional uniform lighting instruments (soft boxes) and reflection (bounce) cards.

16 Claims, 10 Drawing Sheets

65 + Compliment

65 + Compliment + Botch

85 + Compliment + Rendered Clouds

BI-TRIADIC COLORS (RGB+CMY)

ENVIRONMENTAL LIGHTING SYSTEM AND METHOD

CROSS-REFERENCE TO RELATED APPLICATIONS

The present application claims priority to U.S. Provisional Patent Application Ser. No. 62/083,480, entitled ENVIRONMENTAL LIGHTING SYSTEM, filed Nov. 24, 2014, all of the teachings of which are included herein by reference.

STATEMENT RE: FEDERALLY SPONSORED RESEARCH/DEVELOPMENT

Not Applicable

BACKGROUND

The present invention relates to lighting systems that cast selective color lighting upon subjects in photography as encompassed by both digital and photochemical processes, and in both still and motion pictures.

Lighting equipment has evolved over the 150 years from using sunlight outdoors and gas flames indoors to where it is today with robust mix technologies including LED, tungsten filament, metal halide (HMI) and sunlight. As is well known in the art, the lighting emitting from these sources may be aimed directly at the subject, softened with a diffusion material, or reflected off of a bounce source.

The primary goal of all of these technologies is to provide a standard "white" source of illumination for photographic subjects. The result is that the subjects appear to have been photographed in a white-walled room. In fact, it has been undesirable to have anything other than a uniform white soft source of lighting for the last 30 years. While there are color-correction filters that are used on lighting sources, the use of filters still offer only uniform illumination sources.

Photochemical capture technologies (including conventional film) tend to be more forgiving and the uniform lighting techniques that have developed up to this point have resulted in acceptable and "natural-looking" results. The demise of film capture and the proliferation of digital capture, however, have created a need for different lighting tools to achieve "natural-looking" results. Digital photography is notoriously unforgiving and many in the photographic and filming arts complain about its harsh, artificial look that tends to accentuate the flaws of the subject. For example, while existing reflection boards and materials are extensively used as fill light in outdoor photography, they tend to make the subject look "artificially lit." Additionally, in digital photography, flaws in the skin tend to be emphasized using these types of reflectors; this is undesirable as the goal in most photography is to render the subject with flattering results.

As a consequence, digital capture has revealed a paradox in traditional lighting—how can you photograph a subject in the real world (with many colors) when the only lighting source uses white sources? In nature there is rarely a uniform light source, therefore there is an inherent problem in photographing subjects using only uniform white soft sources. At the same time, undesirable results will be achieved if random colors are thrown at the subject. The result is a false representation of the subject and draws attention to the lighting techniques themselves.

While there are specialized lighting systems in use on high budget motion picture stages that mimic the colors of a moving environment by using playback of an environment on large screens to create the effect of passing through a specific environment, such technology is typically far beyond the scope of the average photographer/cinematographer. As a consequence, the substantial majority of photographers and cinematographers have no alternatives in terms of accessible lighting systems that can address the shortcomings mentioned above with the use of white lighting sources and the undesirable effect such white lighting sources have, particularly with respect to digital photography and filming.

There is thus a need in the photography and cinematography arts for a lighting system that creates a natural look that mimics the ambient light of natural surroundings that can be captured digitally. There is likewise a need in such arts for a lighting system that can be readily substituted for white light sources that is of simple construction, easy to deploy and exceptionally low cost that can be readily integrated for use with existing digital photography and cinematography equipment.

BRIEF SUMMARY

The present invention specifically addresses the above-identified deficiencies in the art. In this regard, the present invention is directed to a lighting system that uses carefully chosen colors as arranged in patterns that combine on the subject to create a "natural" look without imparting a strange colorcast. To that end, the lighting system of the present invention uses laws of light physics to achieve its dramatic effects. This system gives the illusion of "natural" light sources through the use of: broken color theory, angle of (light ray) incidence, specular highlights (as related to photography and the human face) and sinusoidal color patterns that mix the light to achieve both separation of color and natural blending. The lighting system of the present invention further uses additive broken color theory to create white light using combinations of complementarity colors and color harmonies. When added together, the colors make white light however, because the colors are separated in the lighting patterns of the present invention, irregularly shaped subjects, especially human faces, will have subtle color shifts as the angle of incidence changes over curves and small irregularities (pores, etc.) that will soften the imperfections of the subject's face.

The lighting system of the present invention, when used as lighting and fill sources, tend to soften flaws, and give a more "natural" rendering to the images. These patterns are easy to reproduce and may be preferably generated as color patterns comprising two or more colors operative to complement one another wherein each respective color is distributed and operative to cast light via a sinusoidal orientation. For example, the patterns can be printed on diffusion material on a soft light source or simply printed on a bounce light source. In one preferred embodiment, the system will consist of a triadic scheme of three primary colors, such as red, blue and green, wherein each respective color is operative to cast or reflect a specific color of light upon a subject according to a sinusoidal pattern. In this regard, the illumination source will thus be operative to reflect multiple colors, as well as white light upon a subject based upon the orientation of the various colored lighting patterns as cast upon the subject to be photographed or filmed. The selection of colors and generation of sinusoidal patterns may be readily accomplished by any of a variety of means well-known to those skilled in the art and can easily be available to everyone currently using a commercially produced reflector or soft light.

From candid and wedding photography to photographing actors on film sets, the lighting system technology is versatile and easy to use, and will easily enable any photographer to faithfully capture subjects in a manor not achievable using current inexpensive technologies. There are no special talents needed to enjoy the benefits of this technology—it is used exactly as current lighting devices—with different results.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The above description is given by way of example, and not limitation. Given the above disclosure, one skilled in the art could devise variations that are within the scope and spirit of the invention disclosed herein, including various ways of generating and deploying a lighting system for use in photography and filming whereby combinations of white light and selectively constructed patterns of colored light are cast upon a subject being photographed or filmed. Further, the various features of the embodiments disclosed herein can be used alone, or in varying combinations with each other and are not intended to be limited to the specific combination described herein. Thus, the scope of the claims is not to be limited by the illustrated embodiments.

Specifically, the lighting systems of the present invention are operative to cast light on a subject being filmed or photographed such that the light cast upon the subject emanates from a selectively designed pattern of at least two complementary colors such that when combined, the complementary colors will produce white light but otherwise cast light corresponding to their respective colors. The colored patterns are thus operative to not only cast white light upon a subject, but also colored light as reflected from different angles about the subject about the subject upon which the light is cast to thus produce lighting that is a combination of both white light and selectively generated colors. To that end, the lighting system of the present invention contemplate the use of additive broken color theory to create white light using combinations of complementary colors and harmonious color combinations.

When such colors are combined, they are operative to generate white light. However, the present invention seeks to separate such separate light components into discrete patterns such that when cast upon a photographic subject, and in particular an irregular shaped subject, such as the human face, there will thus be caused subtle color shifts due to changes in the angle of incidence over curves and other small irregularities. As a consequence, the color shifts, which will correspond to the surface changes, curves or irregularities and the like, and will cause a visual "softening" that would otherwise appear as discrete and noticeable demarcations of the image being photographed or filmed. For example, using a uniform white lighting source upon a subject, such as an individual's face, the use of white light, particularly when used for filming or photography with digital technology, will cause irregularities upon the skin to be captured with extreme detail, such as small irregularities, blemishes, and the like that may be deemed undesirable.

Figure 1:
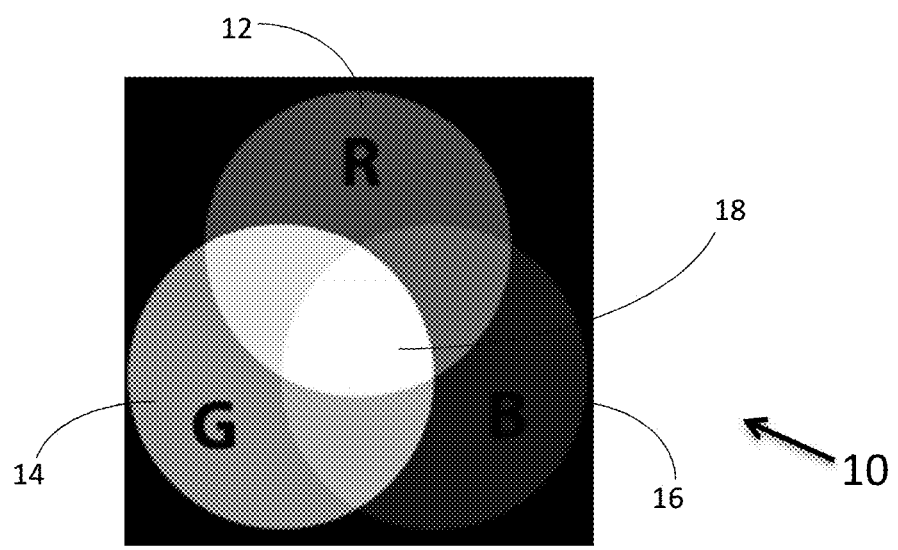
FIG. 1 illustrates a triadic color harmony scheme incorporating the colors red, blue and green that are operative to collectively combine to produce white light and various colors and color combinations.

Referring now to FIG. 1, there is shown how a combination of colors, namely, red, green 14 and blue 16, are operative to combine to produce white light 18, but at the same time produce colors produced by the combination of only two such colors, for example, red and blue and green and blue, as well as portions indicating just the colors red, green, blue themselves. In such typical triadic color harmony scheme, the combined red 12, green 14, and blue 16 light will combine to give off white light 18 to flat and solid objects. However, human faces react differently—they have curves, wrinkles, pores and all sorts of imperfections—and that is where the broken colors combine to "soften" those imperfections by rendering them as different colored points of light, and has much to do with the specular highlights of the human face.

In order to produce such desired effect, the present invention comprises a lighting system that utilizes a selectively designed pattern of complementary colors that are cast upon the subject to be filmed or photographed. In the practice of the present invention, the first process is selecting the complementary colors that will be cast upon the subject per the lighting systems of the present invention. Such color selection process may be determined by any of a variety of well-known methods in the art.

Additive Complementary Color schemes (color harmonies) in the RGB (red, green, blue) model are well understood in art and science. They are infinite in number, and the key to their use in the systems of the present invention is that they create a specific effect: creating neutral white (grey) or a controlled specific color cast that can be used by the photographer for effect.

Color Harmony Examples

Figure 9:
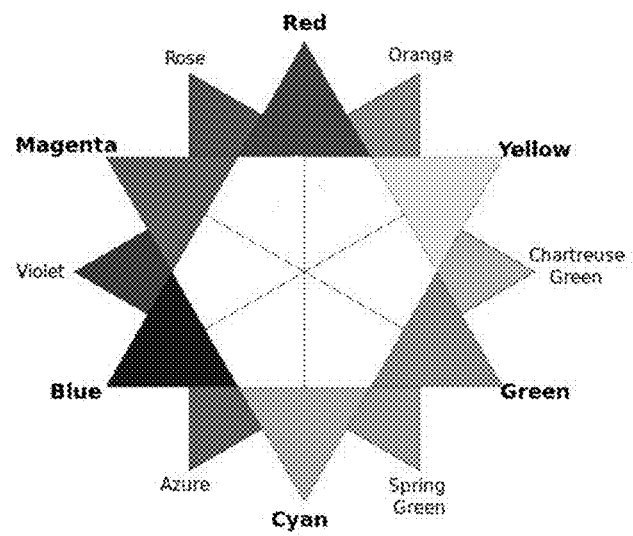
FIG. 9 is a color spectrum for use in generating complementary color patterns in accordance with a preferred embodiment of the present invention.

The combination of two of the standard three additive primary colors in equal proportions produces an additive secondary color—cyan, magenta or yellow. Therefore, white light can be created by the addition of two complementary colors on the standard RGB color wheel (as shown in FIG. 9).

Direct complementary colors would include: Red-Cyan, Blue-Yellow, Green-Magenta; however, by using a standard color wheel, any two colors can be chosen provided they are 180 degrees from each other on the standard RGB color wheel.

In addition to direct 180 complementary colors, there are many different color combinations that can be used to create white light or a specific color. These include:

Triad

Figure 10:
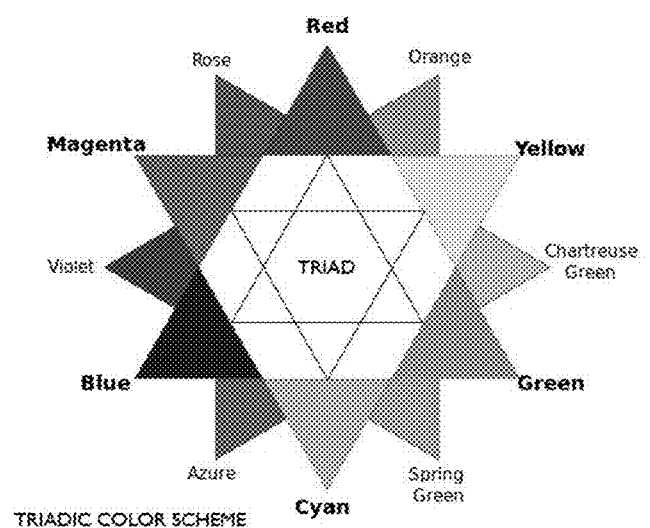
FIG. 10 depicts a triadic color scheme as generated from the color spectrum of FIG. 9.

A triadic color scheme uses colors that are evenly spaced around the color wheel using colors that are each separated by 120 degrees on the color wheel. This could be red-green-blue or cyan-magenta-yellow to any other combination of three colors separated by 120 degrees on the standard RGB additive color wheel, as shown in FIG. 10.

Split-Complementary

Figure 11:
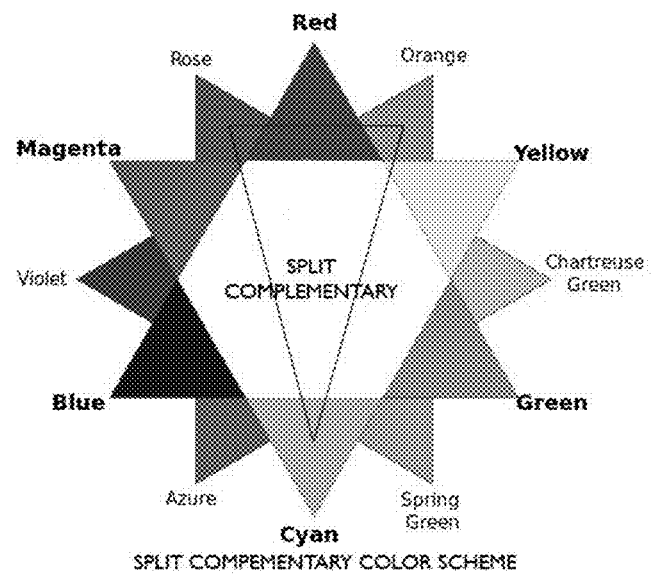
FIG. 11 depicts a split-complementary color scheme as generated from the color spectrum of FIG. 9.

The split-complementary color scheme is a variation of the complementary color scheme. In addition to the base color, it uses the two colors adjacent to its complement to create white light, as shown at FIG. 11.

Rectangle (Tetradic)

Figure 12:
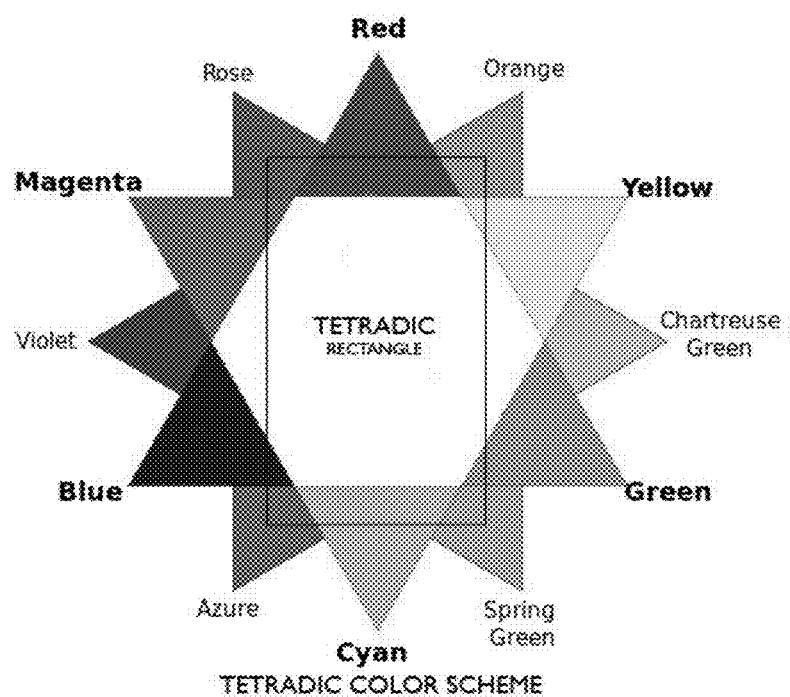
FIG. 12 depicts a tetradic color scheme as generated from the color spectrum of FIG. 9.

The tetradic color scheme uses four colors arranged into two complementary pairs to create while light, as shown at FIG. 12.

Square

Figure 13:
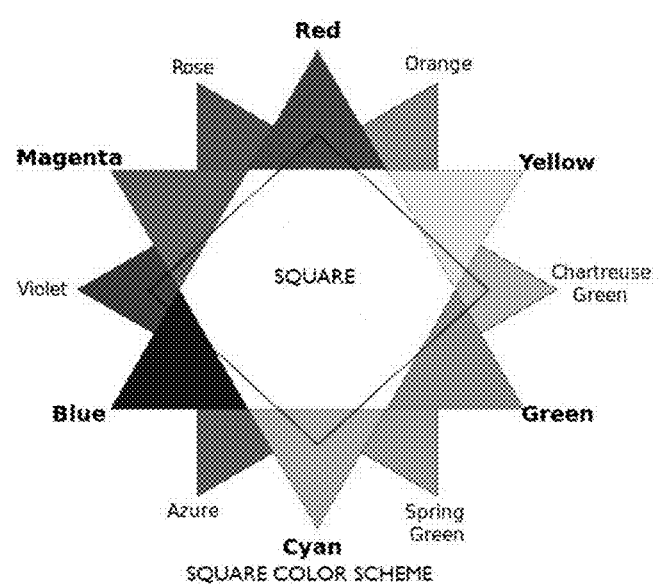
FIG. 13 depicts a square color scheme as generated from the color spectrum of FIG. 9.

The square color scheme is similar to the rectangle, but with all four colors spaced evenly around the RGB color wheel, as shown at FIG. 13.

The key to choosing color schemes for use in the practice of the present invention is that the total value of transmitted or reflected light is either white light or a specific color that can be used by the photographer to achieve a desired effect, such as color correction or other special needs. It is believed such concepts would be readily understood by those skilled in the art as shown in the following example.

Example 1

Figure 14:
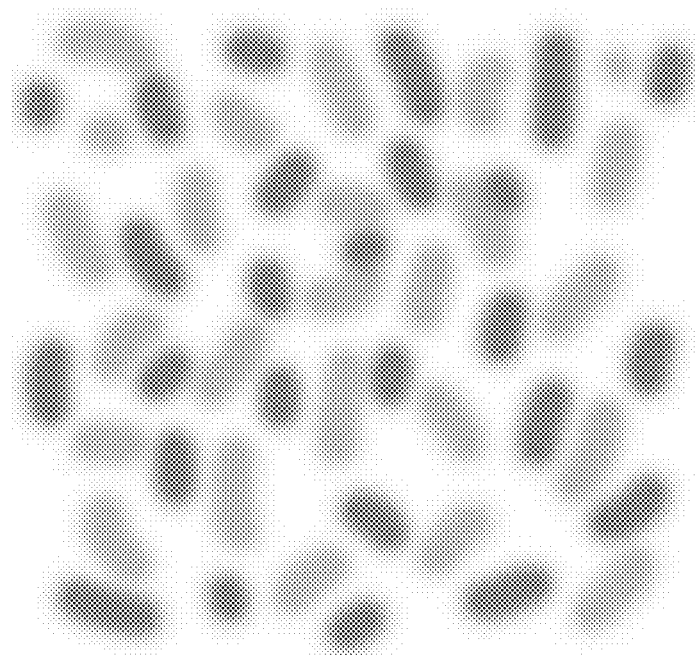
FIG. 14 depicts a representative complementary color scheme as arranged in a pattern for use in the practice of the present invention.

The standard photographic color correction filters are used on lights and lenses to correct different lighting conditions (different color temperatures in degrees kelvin). (This is a useful color because it is well known by professional photographers and cinematographers.) By using complimentary colors of the color correction filter colors on Bokeh patterns you will end up with an additive mix that will give you white light. (Note that complementary colors of color correction filters are not the same as simply using combinations of color correction filters to cancel each other out. A sunlight to tungsten filter (−2300° k) will not be the same as a tungsten to daylight filter (+2300) because they are balancing the light to create a full spectrum for a given color temperature.) The Bokeh colors are mixed using a densitometer to create white light or an intended specific colorcast. These complementary colors are identified in TABLE 1 below and shown in the illustrative example of FIG. 14.

TABLE 1

| CC FILTER | Yellow | Magenta | Cyan | |
|---|---|---|---|---|
| CTsun 85 | 58 | 31 | 0 | −2300° k |
| Compliment | | 29 | 60 | White Light |

In practice the system of the present invention mixes an infinite number of colors and their compliments to create white light on a flat smooth object and broken light on a curved-irregular or rough surface with specular highlights. Such complementary colors will thus be operative to produce white light, when combined with one another, but otherwise retain the individual color quality.

Figure 3:
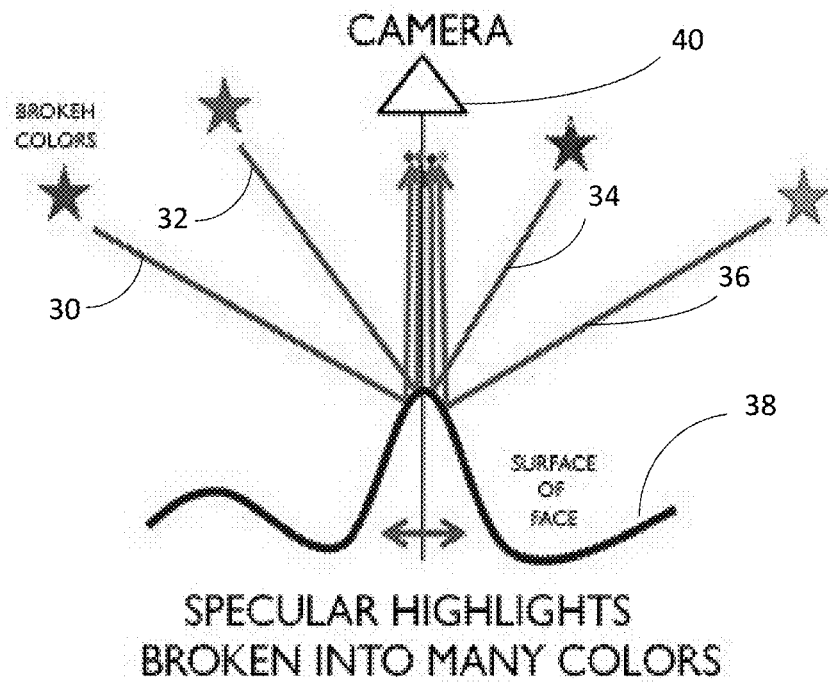
FIG. 3 depicts multiple colored light sources reflecting light upon a surface being filmed or photographed by a camera whereby the light from the colored light sources is shown being reflected off the surface being photographed or filmed at various angles.

In addition to the selection of the complementary colors, which at a minimum will include at least two colors, and preferably three or more, such colors are arranged in a selectively controlled pattern that will be operative to cast both white light upon a subject, as well as the individual colors of the color scheme. The net photographic effect that is produced by the use of the lighting and color patterns of the present invention can be seen in FIG. 3, which illustrates the effect of colored light sources 30-36 as reflected off a given surface 30, such as the face of an individual. As illustrated, the colored light sources 30-36 coming from different angles reflect off the surface of the face 38 and reflected to the camera 40 at different angles of incidence. The camera 40 is thus able to capture color variations reflected off the facial surface as captured as microscopic colors, as opposed to a uniform reflection of white only light.

Whereas the simple breaking of the colors into different colors into compliments might seem to be the best design for a color pattern per the present invention, in practice there are limitations. This can be seen in theatre lighting where often primary colors on different lighting units are mixed to create white light—but with obvious shadows of the missing colors, which give undesirable effects in photography. The solution is the in the pattern upon which the colors are arranged.

Sinusoidal Color Patterns

The present invention contemplates that the color patterns utilized as part of the lighting system may be arranged in any of a variety of patterns.

Figure 4:
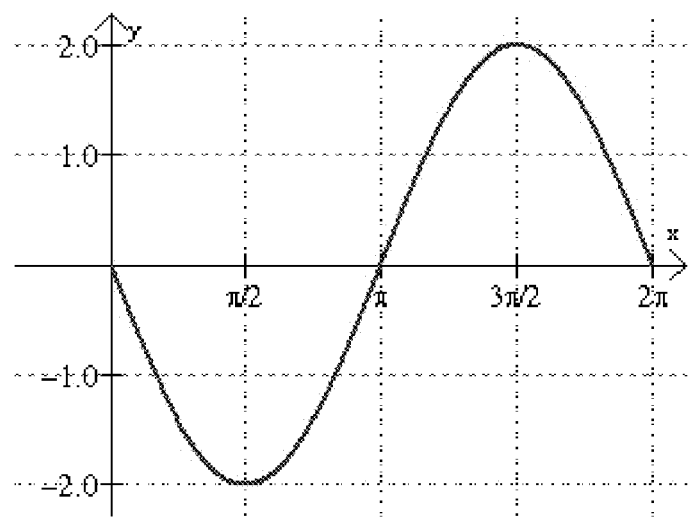
FIG. 4 is a graphic depiction of a conventional sine wave.

Among the most particularly well-suited patterns for use in the practice of the present invention is a sinusoidal arrangement of the complementary colors. As is well-known, sinusoidal or sine wave is a term used in trigonometry to describe a curve that can mathematically be expressed in the form y+A sin(b(x−C)+D. Sine waves, such as the one illustrated in FIG. 4, occur in nature in the form of ocean waves, light waves, sound waves—and even the daily fluctuations of daily temperature. Sine waves are also the key to many of the color patterns utilized in the present invention to provide versatility and naturalistic effect.

Figure 5:
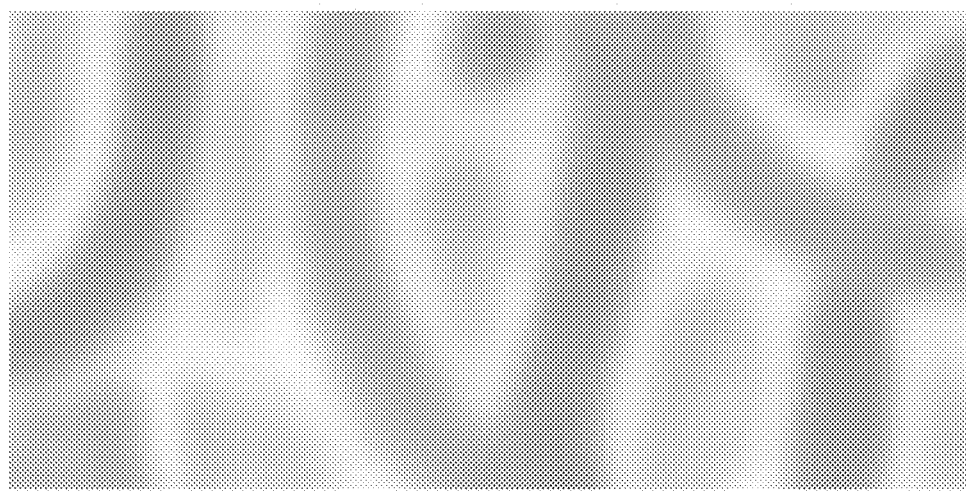
FIG. 5 is a triadic color scheme as generated using sine wave patterns.

The incorporation of sine wave designs in the color patterns has enabled the use of stronger color values without the unwanted separation in the shadow areas of the subject. An example of a color pattern incorporating sine waves per the use of the present invention is illustrated in FIG. 5, which shows red, blue and green color harmony scheme as interwoven with one another via a sinusoidal wave pattern. Such pattern may thus be transferred to a reflection card or otherwise utilized to replace traditional uniform lighting instruments.

Alternative Color Patterns

Whereas the sinusoidal wave pattern provides one of the strongest patterns with the least artifact in shadows there are an infinite number of patterns that can be used provided that the overall reflected or transmitted light combines to create either white light or a special desired effect. To that end, the balance between keeping the lighting system herein described effective and the undesirable results of having a strange pattern reflecting off a mirror-like surface (corrective eyeglasses, car windows etc.) can be overcome by using other patterns that mock the look of out-of-focus highlights (bokeh) in photography. When photographic lenses with a shallow depth of field are used it is possible to have areas of the image where the lens is not projecting a sharp point of light onto the imager. Traditionally these were known as "circles of confusion" where the cones of light rays refracted through the lens system focused either in front of or behind the imager (film or sensor). In recent photographic literature these out of focus areas of the image are referred to as bokeh. (A borrowed Japanese word boke that means soft.) These artifacts are present in most photography to some extent and the appearance of area that looks "out of focus" in a refection that is not the center of interest is acceptable and in many cases desirable.

Using the same 85 color correction filter described in the color harmony section discussed above, there is now provided a description of some of the techniques used to camouflage the complimentary colors when using shiny objects.

Figure 15:
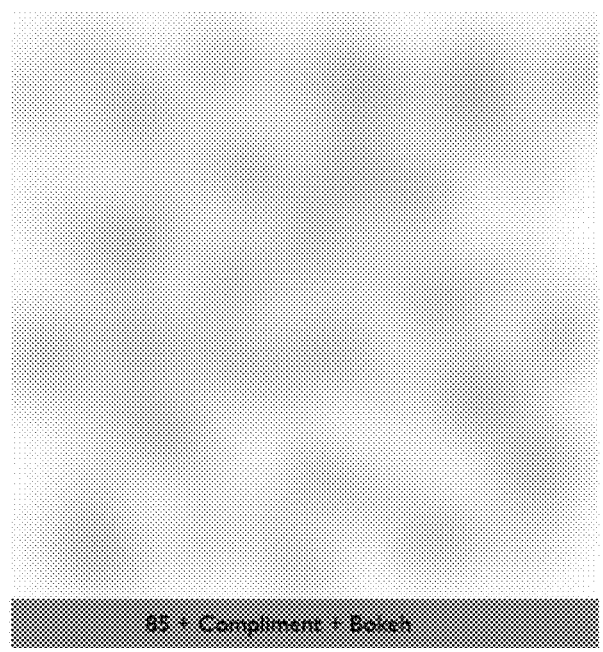
FIG. 15 depicts an example of a color pattern using defocusing filters and rendering the pattern as a cloud pattern.
Figure 16:
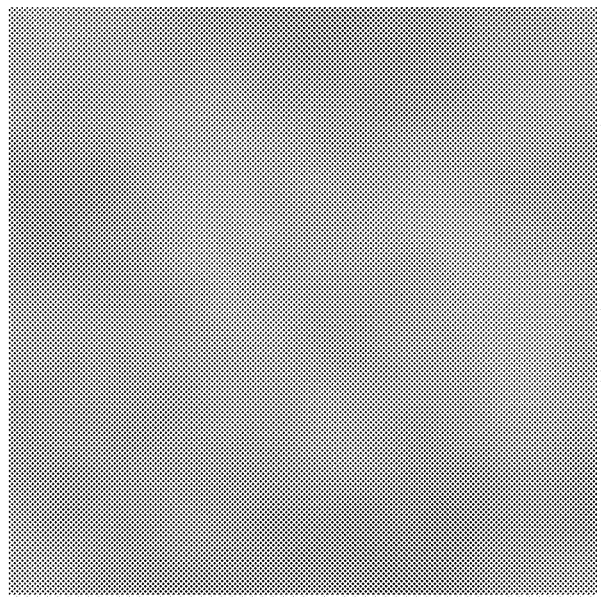
FIG. 16 depicts a further example of a color pattern using defocusing filters and rendering the pattern as a cloud pattern.

FIG. 15 and FIG. 16 illustrate two examples: using defocusing filters on the pattern and rendering the pattern as a cloud pattern. As long as the final result is a predictable quality of light (reflector of light source) and the areas of color cover a proper arc from the subjects' point of view any pattern can be used to create the desired effect described herein.

Figure 17:
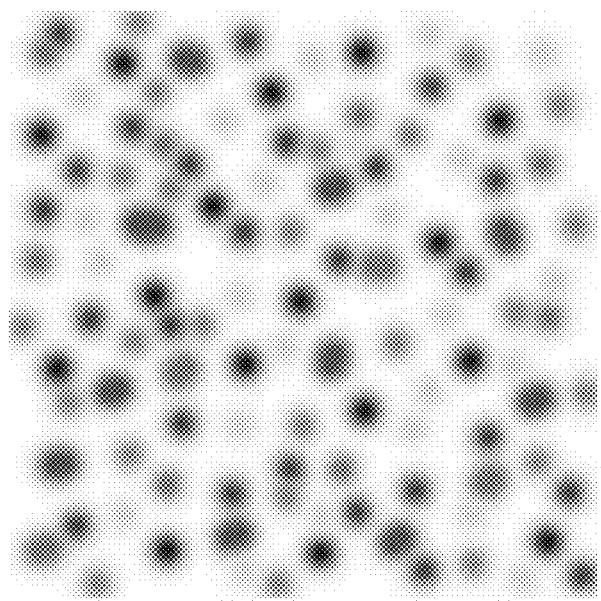
FIG. 17 is a representative example of a double triad color harmony as applied to a white background, said double triad color harmony being designed and arranged for use in the practice of the present invention.
Figure 18:
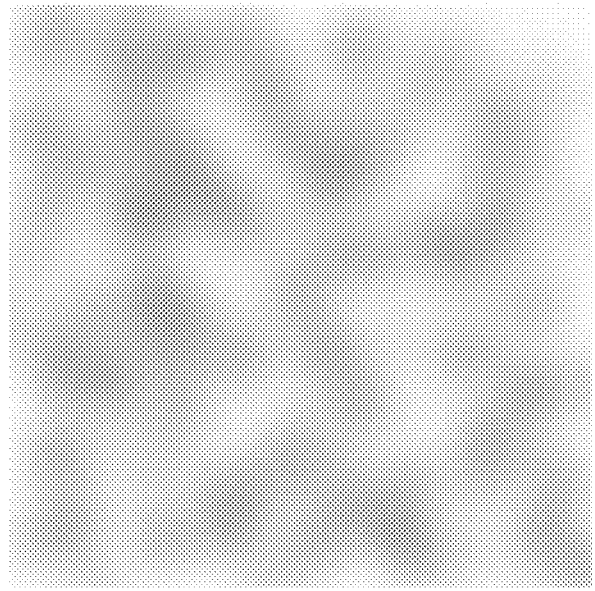
FIG. 18 is a further representative example of a double triad color harmony as applied to a white background, said double triad color harmony being designed and arranged for use in the practice of the present invention.

In FIG. 17 a double triad color harmony was applied to a white background. In FIG. 18, a filter was applied to the same colors to create the feeling of out of focus highlights.

Figure 19:
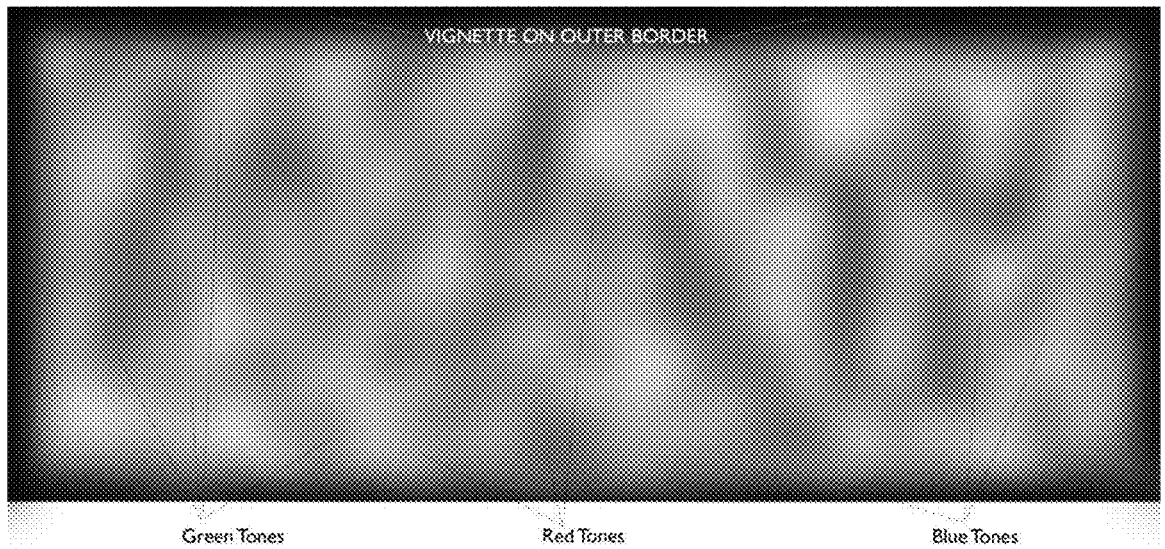
FIG. 19 depicts a red, green and blue (RGB) color scheme that is defocused to create a color-correct lighting source further including a vignette effect.

FIG. 19 illustrates the use of a RGB color scheme in different color harmonies and values to create 12 colors that are often found in natural surroundings. This includes dark browns, sky blue, and even shades of red for color balance. The final result was then defocused to create a color-correct lighting source. Finally a vignette effect was added to make the edge of the lighting source less visible in a reflection, as shown in FIG. 19.

Generation of Color Patterns

Figure 6:
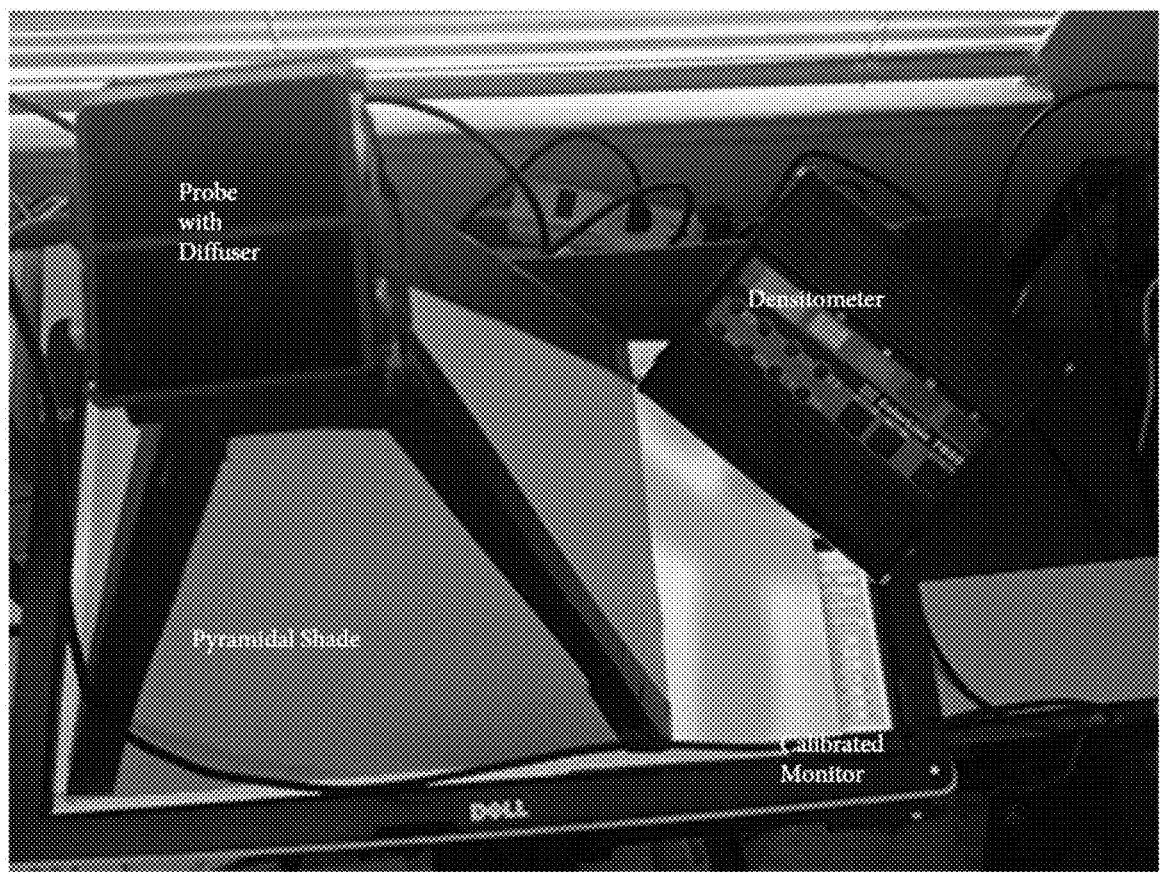
FIG. 6 depicts a combination of a cone-shaped light proof housing attached to a monitor with probe, the latter including a diffusion screen for measuring the total light emitted from the monitor.

Color patterns generated for use in the present invention are constructed by using a color densitometer, a calibrated computer monitor and graphic software. A cone-shaped lightproof housing is attached to the monitor with the probe installed on the end of the cone, as shown in the arrangement of hardware in FIG. 6.

On the probe is a diffusion screen that will combine and measure the total light coming off of the monitor.

Figure 7:
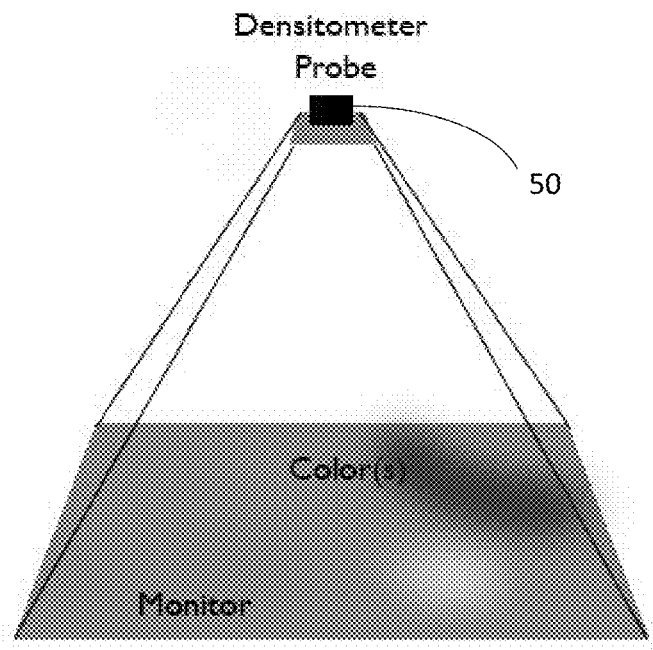
FIG. 7 depicts a densitometer probe with monitor operative to generate a colored sinusoidal pattern for use to practice the present invention.

To generate a versatile pattern like the example above, namely a triadic color harmony with a value balance of three colors (red, green, blue), color will be added while the densitometer 50 is operating and giving a reading of the average of the entire pattern, as shown in FIG. 7. The colors are added in different areas with equal intensities to achieve an overall effect. This could be a neutral white or a special color.

Figure 8:
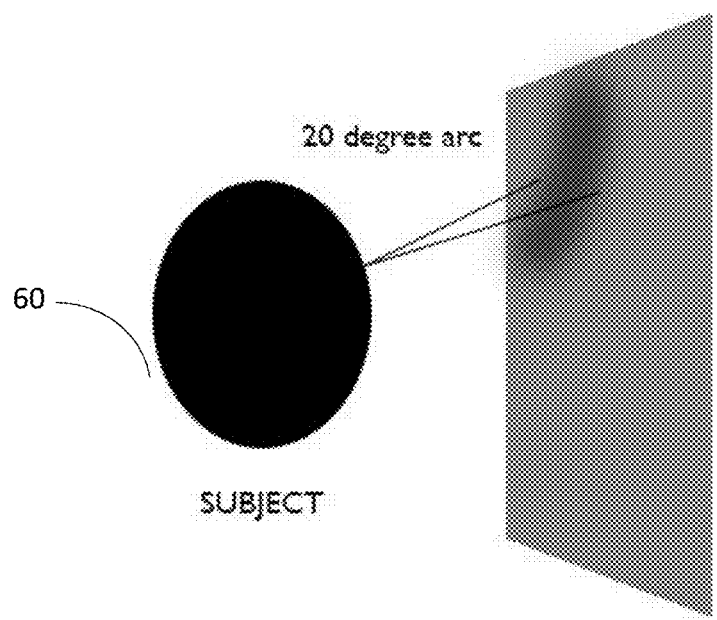
FIG. 8 depicts the spatial relationship between a subject and a color, as utilized as part of a color pattern, whereby the size of the particular color is presented in an arc of approximately degrees relative the subject.

The size and shape of the pattern depends upon the final size of the lighting unit or reflector. The further away a source is from the subject the larger the pattern must be to achieve the desired effect. However, as should be recognized, a pattern that is too bold will create uneven color on the subject. The sine wave patterns tend to minimalize this issue but the optimal size of the color in relation to the subject 60 is an arc between 5 and 20 degrees, as shown in FIG. 8. This could be a single shape (soft circle) or the width of a line or curve (sine wave).

After rendering the pattern on a substrate, either translucent or reflective material, the pattern must be tested again to ensure that the printing process was accurate. To accomplish this, the densitometer is again used. The user will null the densitometer on a piece of the illuminated substrate without the pattern, illuminate the pattern, and measure. The resulting light value should be the same as during the pattern design.

Advantageous Effects of Invention

Figure 2:
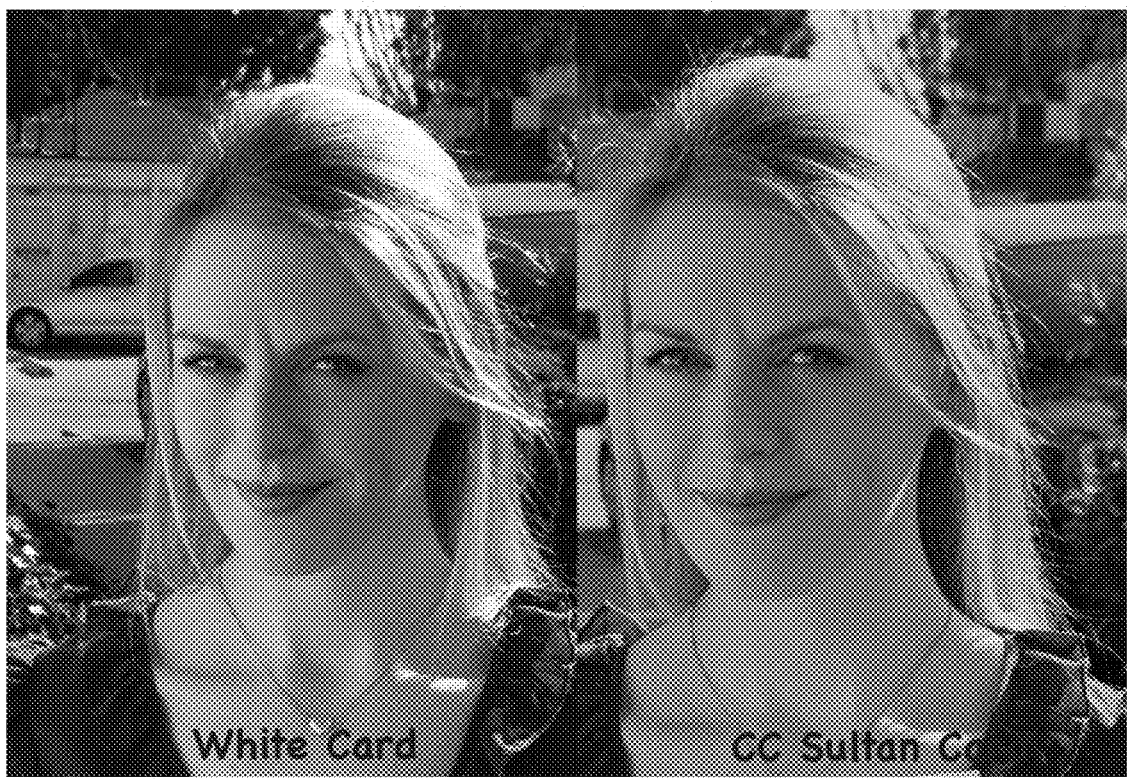
FIG. 2 is a comparison of two photographs whereby the photograph on the left depicts a photograph of a model taken using a pure white light source and the picture on the right using a lighting system constructed in accordance with a preferred embodiment of the present invention whereby a pattern of broken or isolated colors are selectively cast upon the subject.

The lighting system, as used to cast the desired color patterns discussed above, is a simple solution to enhance photography using the physics of broken light theory to create the illusion of "natural lighting." As an example, and referring now to FIG. 2, there is shown a comparison of a model photographed with a conventional white card, to the left 20, and on the right a photo 22 of the same model in the same orientation with a light reflection card (not shown and referenced as a CC Sultan Card) having a color pattern as generated through the present invention. Photographers are aware of the specular highlights in the human, as they can be both friend and foe. The lighting system of the present invention seeks to take advantage of such properties by breaking the specular highlights into many different colors, softening the appearance and turning a problem into an asset.

Even if the specular highlights are not pronounced as the photo on the far left of FIG. 2, they still exist on wrinkles, scars and pores. The right-side photo taken with novel color filter card on the far right illustrates how (because the colors on the color pattern card are striking the models face at slightly different angles) the specular highlights and imperfections are broken up and diffused. The model "looks younger" and the lighting is "more natural."

Such enhanced, natural lighting is believed to be particularly useful as recent advancements in digital photography have pushed image resolution to the point where the flaw in many subjects is revealed. When the subject is a human face, this presents a real problem because the "old school" answer of using diffusion filters on the camera is out of fashion. The lighting system as described herein uses the high resolution of the digital cameras to its advantage, creating mini-color harmony designs in every facial pore and wrinkle. Whereas these microscopic patterns themselves are beyond the resolution of the imager, the soft and moving color combinations create a feeling of depth far greater than white light sources alone.

Additional modifications and improvements of the present invention may also be apparent to those of ordinary skill in the art. Thus, the particular combination of parts and steps described and illustrated herein is intended to represent only certain embodiments of the present invention, and is not intended to serve as limitations of alternative devices and methods within the spirit and scope of the invention.

What is claimed is:

1. A lighting system for casting light upon a subject to be filmed or photographed, the system comprising:
    a light reflection card having a color pattern comprising two or more colors that additively combine to produce white, such that, when white light is incident on the color pattern, the resulting reflected light of said two or more colors combines to produce white light on the subject, each respective color of said two or more colors being arranged in a curve defined in a plane; and
    an illumination source for casting white or colored light on said color pattern.

2. The system of claim 1 wherein each respective one of said two or more colors is arranged in a sinusoidal pattern.

3. A method of lighting a subject to be filmed or photographed, the method comprising the steps:
    a) selecting two or more colors that additively combine to produce white for illuminating said subject;
    b) forming a color pattern of said two or more colors selected in step a), the color pattern being formed such that each respective color of said two or more colors is arranged in a curve defined in a plane;
    c) positioning a light reflection card having said color pattern as formed in step b) in proximity to a subject to be filmed or photographed such that, when white light is incident on the color pattern, the resulting reflected light of said two or more colors combines to produce white light on the subject; and
    d) emitting white or colored light upon said light reflection card positioned in step c).

4. The method of claim 3 wherein in step c), said color pattern is positioned relative to said subject to be filmed or photographed in an arc ranging from between 5 and 20 degrees.

5. The method of claim 3 wherein said subject to be filmed or photographed is the face of an individual.

6. The system method of claim 3 wherein in step b), each respective one of said two or more colors is arranged in a sinusoidal pattern.

7. A lighting system for casting light upon a subject to be filmed or photographed, the system comprising:
    a light reflection card having a color pattern comprising two or more colors that additively combine to produce white, such that, when white light is incident on the color pattern, the resulting reflected light of said two or more colors combines to produce white light on the subject, each respective color of said two or more colors being arranged in a curve defined in a plane.

8. The system of claim 7 wherein each respective one of said two or more colors is arranged in a sinusoidal pattern.

9. A lighting system for casting light upon a subject to be filmed or photographed, the system comprising:
    a color pattern rendered on a translucent or reflective material, the color pattern comprising two or more colors that additively combine to produce white, such that, when white light is incident on the color pattern, the resulting reflected or transmitted light of said two or more colors combines to produce white light on the subject, each respective color of said two or more colors being arranged in a curve defined in a plane; and
    an illumination source for casting white or colored light on said color pattern.

10. A method of lighting a subject to be filmed or photographed, the method comprising the steps:
    a) selecting two or more colors that additively combine to produce white for illuminating said subject;
    b) forming a color pattern of said two or more colors selected in step a), each respective one of said two or more colors arranged in a curve defined in a plane;
    c) positioning a translucent or reflective material on which said color pattern is rendered in proximity to a subject to be filmed or photographed such that, when white light is incident on the color pattern, the resulting reflected or transmitted light of said two or more colors combines to produce white light on the subject; and
    d) emitting white or colored light upon said translucent or reflective material positioned in step c).

11. The method of claim 3 wherein said forming the color pattern includes iteratively adding color to the color pattern while periodically measuring an average color of the color pattern.

12. The method of claim 11, wherein said periodically measuring the average color of the color pattern includes obtaining a reading from a densitometer.

13. The system of claim 9 wherein each respective one of said two or more colors is arranged in a sinusoidal pattern.

14. The method of claim 10 wherein in step b), each respective one of said two or more colors is arranged in a sinusoidal pattern.

15. The method of claim 10 wherein said forming the color pattern includes iteratively adding color to the color pattern while periodically measuring an average color of the color pattern.

16. The method of claim 15, wherein said periodically measuring the average color of the color pattern includes obtaining a reading from a densitometer.

* * * * *